UNITED STATES PATENT OFFICE.

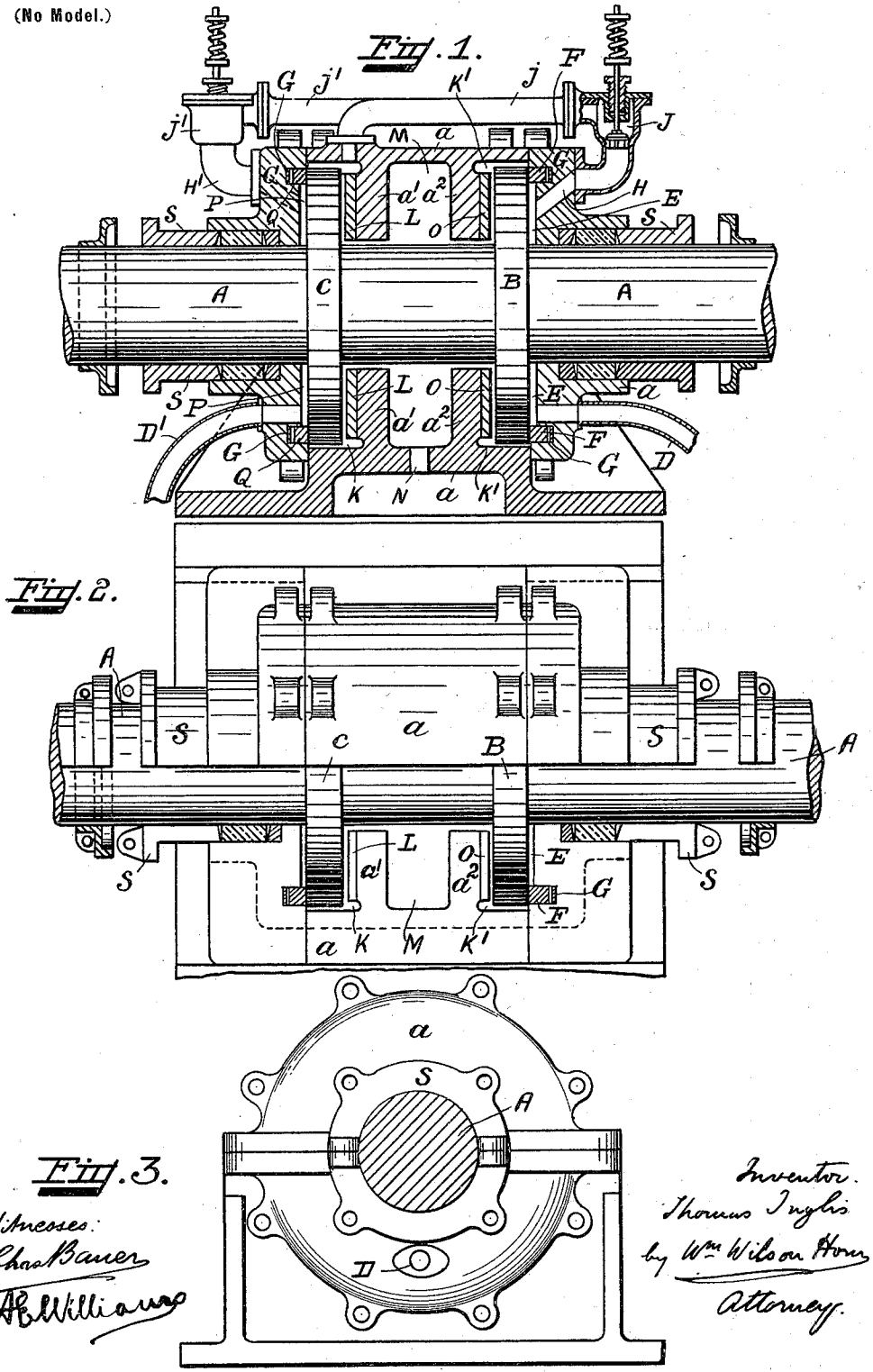

THOMAS INGLIS, OF EDINBURGH, SCOTLAND.

MEANS AND APPARATUS FOR BALANCING FORWARD THRUSTS OF SCREW-PROPELLERS OF VESSELS.

SPECIFICATION forming part of Letters Patent No. 624,497, dated May 9, 1899.

Application filed December 28, 1897. Serial No. 663,992. (No model.)

*To all whom it may concern:*

Be it known that I, THOMAS INGLIS, miller, a subject of the Queen of Great Britain and Ireland, residing at Bonnington Brae, in the city and county of Edinburgh, Scotland, have invented certain new and Improved Means and Apparatus for Balancing the Forward Thrust of Screw-Propellers of Vessels, (for which I have obtained a patent in Great Britain, No. 11,527, bearing date June 20, 1892,) of which the following is a specification.

The object of my invention is to provide means for equalizing the pressure and thereby balancing the forward thrust upon their shafts of the screw-propellers of steam or other vessels whether going ahead or astern and so to reduce and minimize friction. In thrust-blocks for this purpose as usually constructed the surfaces of metallic rings or flanges upon the shaft revolve in contact with fixed metallic or other hard and corresponding surfaces in the thrust-block, and in use there is much friction, and from wear and tear and various causes the arrangement is found to be defective and wasteful of power. According to my invention I employ and apply to the shaft a reactive liquid force equal to and adapted to resist and balance all the forward or longitudinal thrust thereupon. To this end I mount upon the propeller-shaft a piston-like collar or collars inclosed in a suitably-arranged cylinder and having liquid-tight joints therewith. The shaft and collar are capable of some longitudinal motion in the cylinder, and to the said collar I apply the reactive and balancing liquid force and arrange the parts substantially as hereinafter set forth. I do not confine myself to the use of only one such arrangement upon a shaft, as in some cases it may be desirable to provide more than one, and such apparatus may also be used as supplementary to the usual thrust-block, in which case the liquid-pressure is to be so regulated as in effect to relieve the bearing-surfaces of the usual block of practically all the pressure.

I will now fully describe one arrangement for carrying my invention into effect whereby the balancing liquid force may be applied to the shaft whether the engines be going ahead or astern.

Figure 1 is a sectional elevation, Fig. 2 a plan, half in section, and Fig. 3 an end elevation, of the apparatus.

Similar letters refer to similar parts throughout.

A is the propeller-shaft, upon and around which in convenient position I fix or forge the collars B and C of suitable diameter and width of surface, the superficial area of the latter being calculated for the liquid-pressure available for application thereto. The collars B and C are inclosed in the strong metal cylindrical casing $a$, which may be of any convenient external form, such as is shown. It is provided with internal annular flanges or ribs $a'$ $a^2$, each having an annular metallic working face L and O for the collars C B, respectively, fixed thereto, as shown. Suitable stuffing-boxes S S, with packing-glands, are provided fore and aft for the passage of the shaft A, and all the parts may be disposed and arranged substantially as illustrated or in other convenient manner, according to space available and other local arrangements. Fore and aft between the collars and the casing annular spaces E and P about one-half inch wide are provided, and an accurate fit between the collars and casing may be effected by peripheral rings, such as are commonly used in pistons, or by circumferential face-rings, such as are shown at F Q, let into suitable grooves in the casting and constantly maintained in proper positions by spiral or wave springs, such as G G, whereby liquid-tight joints are insured. In the casing $a$ $a$ a small amount of longitudinal motion—say about one-eighth of an inch—is allowed to the shaft and collars, and the arrangement acts, in effect, like the piston in an ordinary engine-cylinder.

I will first describe the action when going ahead. Into the annular fore-end space E, between collar B and casing $a$, any suitable fluid—such as water, oil, glycerin solution, or the like—is forced by any ordinary pump or pumps, worked by the main engine, (not shown in the drawings) through pipe D, by which a reacting pressure sufficient to balance the "go-ahead" thrust of the collar B, exerted by the propeller in driving the ship, is created and maintained, and then the forward thrust is constantly resisted and balanced by an annular cushion of the liquid in space E instead of by metallic surfaces, as heretofore. H is a channel or pipe leading to the escape-valve J, which is regulated to the normal pressure required to keep the back collar C off its face L. The face L takes the thrust of the collar C at starting, and so long as these two surfaces are in contact no liquid can escape from the fore space E; but when the supply-pumps have exerted sufficient pressure to force back the shaft far enough to allow the liquid to pass between the surfaces C and L then both the collars are parted from and maintained off their faces, or, as it were, floating in the compressed liquid. Any overflow or excess of pressure then passes through passage H, valve J, and pipe $j$ to the space K and thence between the faces C and L to the central annular space M, from which it can escape by the exhaust-orifice N. Any leakage past the after face-ring Q exhausts through a suitably-arranged pipe, and all exhausts are returned to the pump-supply. Thus the regulation of the pressure is to some extent automatic, and to prevent accident a safety-valve may with advantage be placed on the supply-pipe D. The action in going astern is precisely the same, the face O taking the thrust of collar B and making a liquid-tight joint therewith until the pressure through the supply-pipe D' is sufficient to part the faces O and B and "float" the collars. Overflow then escapes through passage H', valve J', and pipe $j'$ to space K' and thence between O and B to M and N to exhaust, as described.

Although the apparatus above described is specially designed for liquid reaction, yet in some cases where the pumps fail or in working a vessel in or out of dock or the like the liquid may be dispensed with and the apparatus is nevertheless a serviceable thrust-block.

I wish it further to be understood that my improved apparatus may be used in connection with vertical shafts—say of turbine water-wheels—and other like purposes, so as to relieve the foot-steps of excessive pressure.

Having now particularly described and ascertained the nature of this invention and in what manner the same is to be performed, I declare that what I claim is—

A hydraulic thrust-block adapted to be also used as an ordinary thrust-block and consisting in combination of a casing $a$ having annular flanges or ribs $a'$, $a^2$, each of which ribs is provided with a working face L, O, respectively, circumferential face-rings F, Q, let into grooves in the casting or casing, springs G, collars C, B, on the shaft A, stuffing-boxes S, S, supply-pipes D, D', passages H, H', valves J, J', pipes $j, j'$, spaces K, K', P and E around the collars C, B, and a chamber M having an exhaust N all for the purposes and substantially as set forth.

In witness whereof I have hereunto set my hand in the presence of two witnesses.

THOMAS INGLIS.

Witnesses:
JOHN GEO. STOCKAN,
THOMAS WALDIE.